United States Patent [19]

Niehaus et al.

[11] Patent Number: 5,400,650
[45] Date of Patent: Mar. 28, 1995

[54] APPARATUS FOR COUNTING CYCLES OF FLUID FLOW

[75] Inventors: K. Lynn Niehaus, Manchester; Kevin L. Newcomer, Monroe, both of Mich.

[73] Assignee: QED Environmental Systems, Inc., Ann Arbor, Mich.

[21] Appl. No.: 931,267

[22] Filed: Aug. 17, 1992

[51] Int. Cl.⁶ .......................... G01F 3/16; G01F 1/72
[52] U.S. Cl. ........................................ 73/239; 73/248; 235/94 R
[58] Field of Search .................. 73/252, 239, 198, 248, 73/250; 235/94 R; 377/21

[56] References Cited

U.S. PATENT DOCUMENTS

| | | | |
|---|---|---|---|
| 1,458,383 | 6/1923 | Bassler | 73/250 |
| 2,338,396 | 1/1944 | Bassett | 73/248 |
| 2,374,557 | 4/1945 | Millikan | 73/198 |
| 2,647,660 | 8/1953 | Arena | 235/94 R X |
| 3,057,977 | 10/1962 | Coswell | 73/861.71 X |
| 3,370,750 | 2/1968 | Deutch | 235/94 R X |
| 3,543,008 | 11/1970 | Kes et al. | 377/21 |
| 3,780,579 | 12/1973 | Barnard | 73/861.77 |
| 3,808,886 | 5/1974 | Goldsberry | 73/264 |
| 4,051,724 | 10/1977 | Segal et al. | 73/198 |
| 4,257,751 | 3/1981 | Kofahl | 417/394 |
| 4,489,779 | 12/1984 | Dickinson et al. | 166/64 |
| 4,585,060 | 4/1986 | Bernardin et al. | 166/64 |
| 4,619,134 | 10/1986 | Böhm et al. | 73/239 X |
| 4,627,294 | 12/1986 | Lew | 73/861.05 |
| 4,727,936 | 3/1988 | Mioduszewski et al. | 166/53 |

FOREIGN PATENT DOCUMENTS

| | | | |
|---|---|---|---|
| 2553454 | 6/1977 | Germany | 73/239 |
| 425257 | 9/1947 | Italy | 73/239 |
| 184515 | 10/1983 | Japan | 73/239 |
| 1051710 | 12/1966 | United Kingdom | 73/239 |
| 1314229 | 5/1987 | U.S.S.R. | 73/252 |

*Primary Examiner*—Tom Noland
*Attorney, Agent, or Firm*—Harness, Dickey & Pierce

[57] ABSTRACT

There is provided a counting apparatus which is designed to be located in any position in series with a fluid flow line. The apparatus has a first magnet in an air chamber of the body of the counter. As the fluid passes through the air chamber, the first magnet is forced down the air chamber by the fluid flow. The magnetic field of the first magnet passes through a magnetic field of a second magnet located in the mechanical counter causing the counter to mechanically change the number. When the fluid flow is stopped, a spring returns the first magnet to its original position again passing by the second magnet in the counter allowing the counter to reset for the counting of the next cycle.

4 Claims, 2 Drawing Sheets

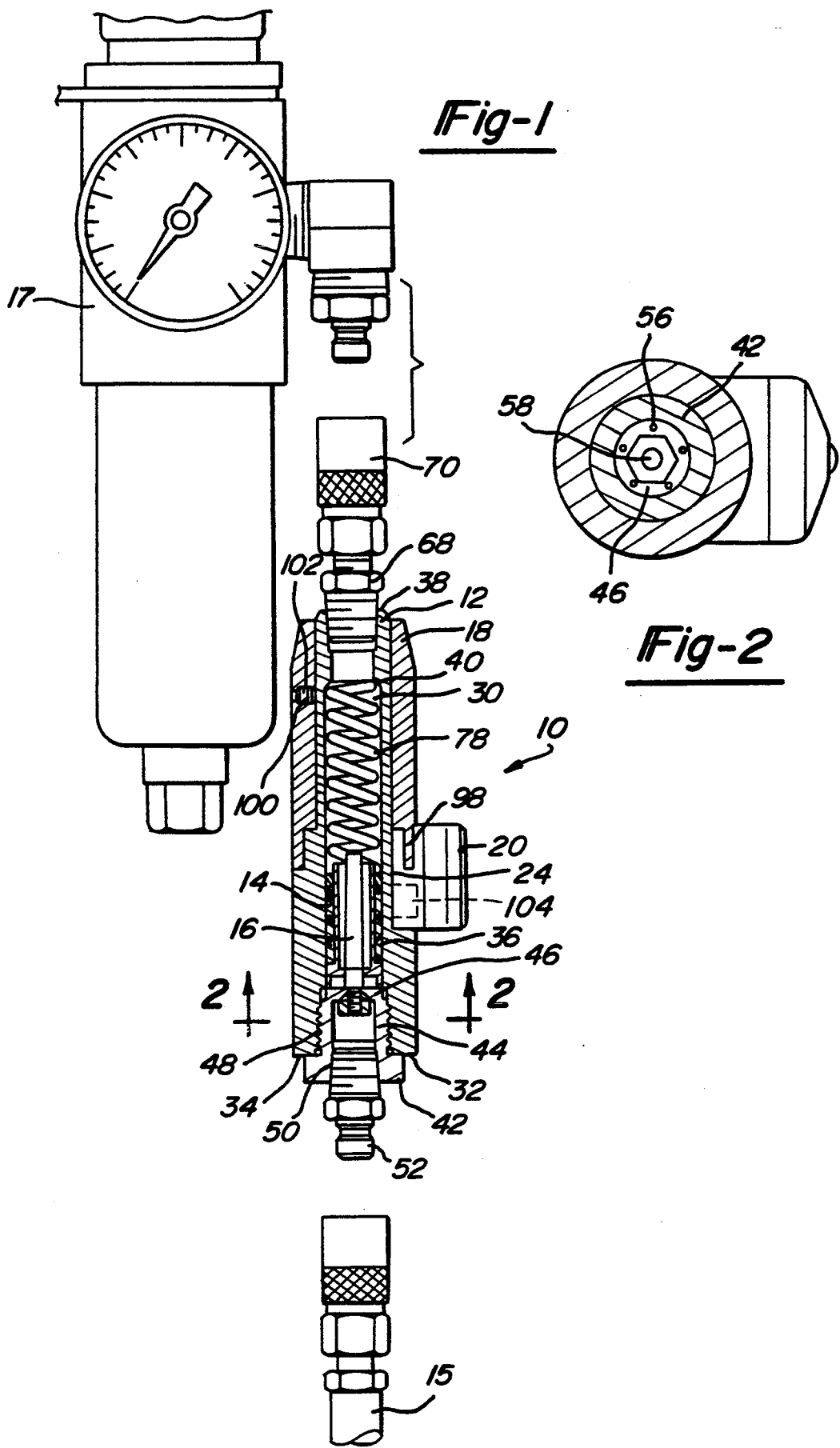

APPARATUS FOR COUNTING CYCLES OF FLUID FLOW

FIELD OF INVENTION

The present invention relates to a fluid flow inline counter. More particularly, the present invention relates to a counter positioned in series with a fluid supply line for counting the number of times fluid flow is cycled through the fluid supply line.

BACKGROUND OF THE INVENTION

This invention is directed towards a counter which is designed to be placed in series with a fluid supply line. The counter will count the number of cycles that fluid flows through the fluid supply line. A cycle starts without having fluid moving through the fluid supply line. A cycle continues with fluid flow moving through the fluid supply line and the cycle ends when the fluid flow is again terminated.

Various devices utilize pressurized fluids to power or operate the particular device. When the device is a machine or apparatus which cycles, the number of times the apparatus cycles may need to be known. A typical example of a cycling apparatus which is powered by a pressurized fluid (normally compressed air) and has the requirement of cycle counting is a pneumatic pump for taking samples of groundwater or other liquids from a well or other monitoring site.

While the present invention is being described for exemplary purposes utilized with a groundwater sampling pump powered by compressed air, it is to be understood that the present invention can be utilized for counting with any type of on/off fluid flow cycling device.

A groundwater sampling apparatus, preferably powered by compressed air, for use in conjunction with the present invention is disclosed in U.S. Pat. No. 4,489,779 issued Dec. 25, 1984 to Dickenson et al. and U.S. Pat. No. 4,585,050 issued Apr. 29, 1986 to Bernardin et al. the disclosures of which are hereby incorporated by reference. The groundwater sampling apparatus disclosed in the above referenced patents is submerged beneath the water level of the groundwater in a well or monitoring site to a suitable depth for obtaining accurate and representative groundwater samples. The apparatus has a first chamber which is in communication with the groundwater and a second chamber which is in communication with a source of pressurized activating fluid (normally compressed air). The first and second chambers are separated by a flexible bladder member. The sample groundwater is conveyed through the apparatus by alternately pressurizing and venting or relieving the pressure in the second chamber which contracts and relaxes the bladder member. The contracting and relaxing of the bladder member will then alternately decrease and increase the volume of the first chamber. Sample groundwater is drawn into the first chamber during the increase in volume under the influence of natural hydrostatic head of the groundwater and is discharged through the pump outlet during the decrease in volume, thereby conveying the sample groundwater through the pump.

When taking samples of groundwater, it is first necessary to purge the water in the well or monitoring site in order to get a representative sample of the groundwater. A well or monitoring site will normally be purged 3 to 5 times prior to taking a sample of the groundwater. Purging the well 3 to 5 times requires a relatively large number of cycles of the pump. In order to be able to effectively and consistently retrieve acceptable groundwater samples, a person must accurately know the number of cycles the pump has gone through.

Accordingly, what is needed is an apparatus for counting the cycles of a fluidic activated device which is operated by a cyclical on and off flow of the operating fluid.

SUMMARY OF THE INVENTION

The present invention discloses a counting apparatus which is designed to be located in any position in series with a fluid flow line. The apparatus has a first magnet in a fluid chamber of the body of the apparatus. As the fluid passes through the fluid chamber, the first magnet is forced down the fluid chamber by the fluid flow. The magnetic field of the first magnet passes through a magnetic field of a second magnet located in the mechanical counter causing the counter to mechanically change the number. When the fluid flow is stopped, a spring returns the first magnet to its original position again passing by the second magnet in the counter allowing the counter to reset for the next cycle.

BRIEF DESCRIPTION OF THE DRAWINGS

The above mentioned and other features and objectives of this invention and the manner of attaining them will become more apparent and the invention will be better understood by reference to the following description of the invention taken in conjunction with the accompanying drawings wherein:

FIG. 1 is a longitudinal side view partially in cross section of a fluid flow counter in accordance with the present invention.

FIG. 2 is a sectional view taken along line 2—2 of FIG. 1.

DETAILED DESCRIPTION OF THE PREFERRED EMBODIMENT

Figure 3:
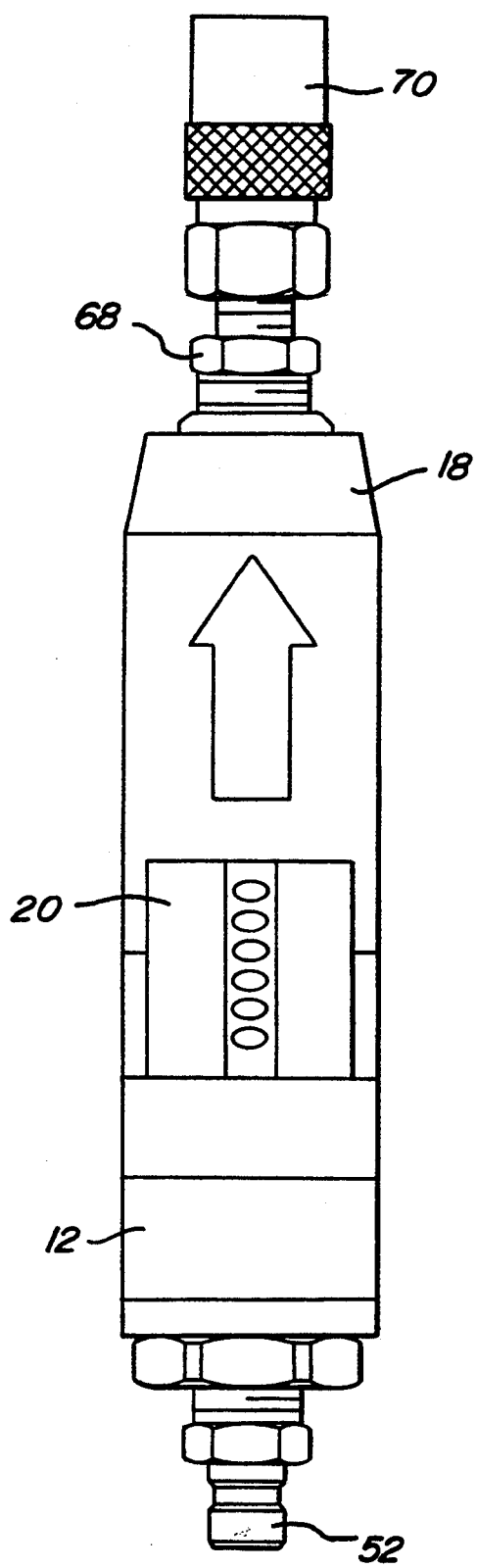
FIG. 3 is another longitudinal side view of the fluid flow counter shown in FIG. 1.
Figure 4:
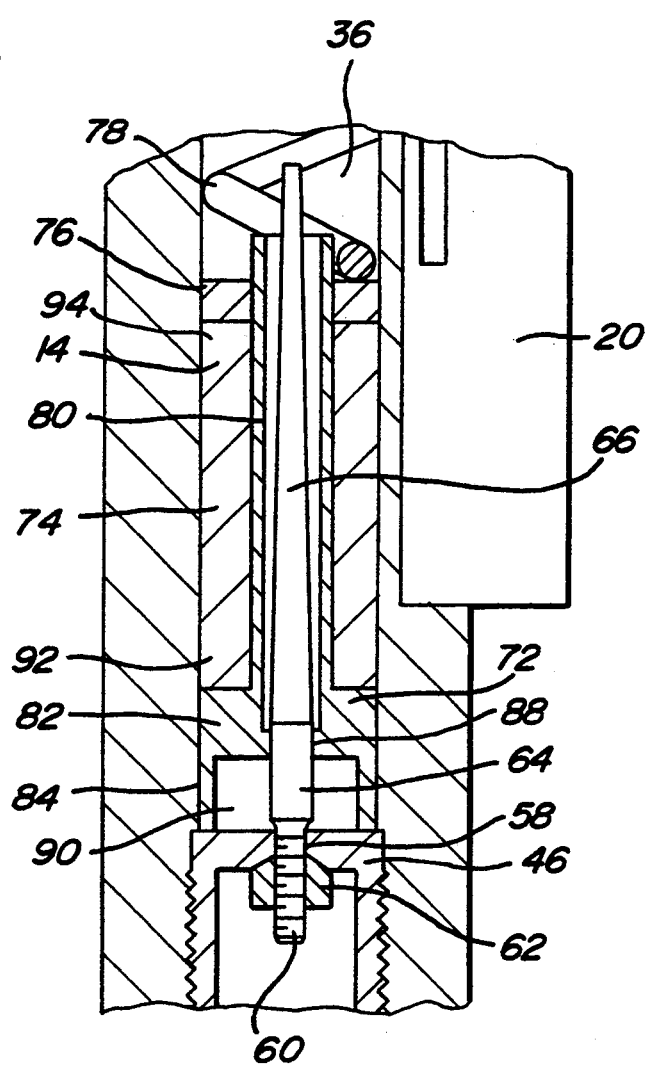
FIG. 4 is an enlarged partially cross sectional view showing the internal mechanism of the counter shown in FIG. 1.

Referring now to FIGS. 1 through 3, a fluid flow cycle counter in accordance with the present invention is shown and is designated by the reference numeral 10. Fluid flow counter 10 is designed to be placed in series between a fluid supply line 15 going to a source of fluid and a device 17 which is operated by the flow of the fluid. In the case of FIG. 1, the device 17 is shown as a pressure regulator which is attached to the operated device. The fluid flow counter 10 comprises an inner housing 12, a magnetic slide assembly 14, a tapered pin 16, an outer housing 18 and a magnetic mechanical counter 20.

Inner housing 12 is a generally cylindrical housing having a generally planar mounting surface 24 for magnetic counter 20. Inner homing 12 defines a generally cylindrical passage 30 extending completely through inner housing 12 and having a first threaded end 32 located on an input side 34 of fluid flow counter 10. First threaded end 32 leads into a cylindrical bore 36 extending longitudinally within inner housing 12. Located on the end of cylindrical bore 36 opposite to that of first threaded end 32 is second threaded end 38. Second threaded end 38 is located at the output end of fluid flow counter 10. Located at the junction of cylindrical bore 36 and second threaded end 38 is spring seat 40.

An input fitting 42 is threadably engaged in first threaded end 32 of cylindrical passage 30. Input fitting 42 has an annular section 44 and an end wall 46. The external surface 48 of annular section 44 is threaded for engagement with first threaded end 32. The internal surface 50 of annular section 44 is also threaded and is adapted to be mated with an appropriate fluid flow fitting 52 for quick connect and disconnect from fluid flow supply line 15. End wall 46 is located on the end of annular section 44 disposed within cylindrical passage 30. End wall 46 has a plurality of holes 56 including a centrally located hole 58 extending completely through end wall 46.

Disposed within centrally located hole 58 is tapered pin 16. Tapered pin 16 has a threaded end 60 which extends through hole 58 and is fixedly secured to end wall 46 by a threaded nut 62. While the present invention shows tapered pin 16 secured to end wall 46 by threaded nut 62, it is understood that tapered pin 16 may be integral with end wall 46 or fixedly secured to end wall 46 by any means well known in the art. Tapered pin 16 has a cylindrical section 64 located adjacent threaded end 60 and a tapered partially conical section 66 which extends from cylindrical section 64 longitudinally within cylindrical bore 36.

An output fitting 68 is threadably engaged in second threaded end 38 of cylindrical passage 30. Output fitting 68 is annular in shape with an external surface threaded for engagement with second threaded end 38. The internal surface is also threaded and is adapted to be mated with an appropriate fluid flow fitting 70 for quick connect and disconnect from the device 17.

Disposed within cylindrical bore 36 between input fitting 42 and output fitting 68 is magnetic slide assembly 14. Magnetic slide assembly 14 is comprised of an inner sleeve 72, a magnet 74, an upper sleeve 76 and a spring 78.

Inner sleeve 72 has an annular section 80 and a flange 82 located at the end of annular section 80 adjacent to input fitting 42. Flange 82 has an external surface 84 which is guided by the interior surface of cylindrical bore 36. The internal surface 88 of flange 82 is adapted to slidably engage cylindrical section 64 of tapered pin 16 and together they form a fluid chamber 90.

Magnet 74 is an annular magnet having a south pole 92 disposed towards input fitting 42 and a north pole 94 disposed towards output fitting 68. Magnet 74 is disposed around annular section 80 of inner sleeve 72 adjacent to flange 82 of inner sleeve 72 and is guided by cylindrical bore 36 located in inner housing 12. Inner homing 12 is constructed from a non-magnetic material, preferably aluminum, such that magnetic slide assembly 14 is free to slide longitudinally in cylindrical bore 36. Located at the end of magnet 74 opposite to the end adjacent to flange 82 is upper sleeve 76. Upper sleeve 76 is also disposed around annular section 80 of inner sleeve 72 and is guided by cylindrical bore 36 located in inner housing 12. Spring 78 is disposed within cylindrical bore 36 between upper sleeve 76 and output fitting 68. Spring 78 is seated on spring seat 40 and urges magnetic slide assembly 14 toward input fitting 42 by bearing against upper sleeve 76.

Outer housing 18 is an annular homing and is disposed around the output end of inner housing 12. Outer homing 18 locates and secures magnetic counter 20 to the outside of inner housing 12. Counter 20 is secured between outer homing 18 and inner housing 12 by engagement with flange 98 of outer homing 18. A set screw 100 located in a threaded bore 102 within outer homing 18 locks outer housing 18 to inner housing 12.

Magnetic counter 20 is of a design well known in the art and has a magnet 104 which is used to activate an arm which works through a plurality of gears to rotate a counter dial. Magnetic counter 20 is mounted on planar surface 24 of inner housing 12 such that the north pole of magnet 104 is positioned adjacent to inner housing 12. Counter 20 requires two movements to register a counted cycle. The first movement causes the counter dial to register an additional count. The second movement causes the mechanism to reset in preparation for again registering an additional count. A typical counter of the one described above is manufactured by Hengstler.

In operation, the fluid flow counter 10 of the present invention is connected in series to a fluid flow supply line 15 such that the fluid enters the counter 10 at input fitting 42 and exits the counter 10 at output fitting 68.

Fluid flow enters the fluid flow counter 10 through input fitting 42 and enters fluid chamber 90 through the plurality of holes 56. The fluid flow creates a fluid movement in chamber 90 which acts against magnetic slide assembly 14 which then moves longitudinally within cylindrical bore 36 against the load imposed by spring 78. As movement of magnetic slide assembly 14 continues down the length of tapered pin 16 a greater amount of fluid will pass between partially conical section 66 of tapered pin 16 and the internal surface 88 of flange 82 in magnetic slide assembly 14 as the spacing between these two pieces increases due to the conical section 66 of tapered pin 16. This movement of magnetic slide assembly 14 will continue until an equilibrium between the load created by the fluid movement and the load created by spring 78 is reached. The maximum movement of magnetic slide assembly 14 is determined by the solid height of spring 78. The amount of fluid movement which is required to move magnetic slide assembly 14 can be varied by varying the size of cylindrical section 64 and internal surface 88, the amount of taper in tapered pin 16 or the strength of spring 78.

As the magnetic slide assembly 14 moves past the area where the magnetic counter 20 is positioned, the south pole 92 of magnet 74 attracts the north pole of magnet 104 in magnetic counter 20 and mechanically changes the number shown on magnetic counter 20. When the fluid flow is stopped, spring 78 returns magnetic slide assembly 14 to its position adjacent to input fitting 12. This return movement of magnetic slide 14 resets the counter 20 by the attraction and movement of the north pole of magnet 104 by south pole 92 of magnet 92. Thus the counter 20 has counted one cycle of on/off fluid flow and is now positioned to react to the next cycle of fluid flow.

The orientation of the magnetic poles in the above example were arbitrarily selected. The location of specific poles of magnets can be varied by those skilled in the art to achieve the same operation as described above.

While the above detailed description describes the preferred embodiment of the present invention, it should be understood that the present invention is susceptible to modification, variation and alteration without deviating from the scope and fair meaning of the subjoined claims.

What is claimed is:

1. An apparatus for counting cycles of a fluid flow comprising:
   a first housing defining an internal passage and receiving fluid flow;
   a piston slidingly disposed in said internal passage adapted to be subjected to the fluid flow and movable between a first position and a second position;
   a coil spring disposed in said internal passage and adapted to be subjected to the fluid flow, said coil spring urging said piston into said first position;
   a first magnet fixedly secured to said piston; and
   means for counting fixedly secured to said first housing; said means reacting to the movement of said magnet as said piston moves from said first position to said second position and back to said first position to register a cycle.

2. The apparatus of claim 1 wherein a second magnet is fixedly secured to said counting means for reacting to the movement of said first magnet to register a cycle.

3. The apparatus of claim 1 wherein the movement of said piston from said second position to said first position resets said counting means.

4. The apparatus of claim 1 wherein said apparatus is adapted to be positioned in series with a fluid flow line by a quick connect/disconnect device.

* * * * *

UNITED STATES PATENT AND TRADEMARK OFFICE
CERTIFICATE OF CORRECTION

PATENT NO. : 5,400,650
DATED : Mar. 28, 1995
INVENTOR(S) : K. Lynn Niehaus, et al.

It is certified that error appears in the above-indentified patent and that said Letters Patent is hereby corrected as shown below:

Col. 1, Line 40, "Patent 4,585,050" should be --Patent 4,585,060--;

Col. 2, Line 61, "homing" should be --housing--;

Col. 3, Line 54, "homing" should be --housing--;

Col. 3, Line 66, "homing" should be --housing--;

Col. 3, Line 68, "homing" should be --housing--;

Col. 4, Line 2, "homing" should be --housing--;

Col. 4, Line 3, "homing" should be --housing--; and

Col. 4, Line 5, "homing" should be --housing--.

Signed and Sealed this

Sixth Day of June, 1995

*Attest:*

BRUCE LEHMAN

*Attesting Officer*      *Commissioner of Patents and Trademarks*